United States Patent [19]

Yogome et al.

[11] Patent Number: 4,545,469
[45] Date of Patent: Oct. 8, 1985

[54] CONE CLUTCH

[75] Inventors: Yoshihiro Yogome; Yuuji Kobashi; Kazuyoshi Shinada, all of Osaka, Japan

[73] Assignee: Yanmar Diesel Engine Co., Ltd., Osaka, Japan

[21] Appl. No.: 614,228

[22] Filed: May 25, 1984

[30] Foreign Application Priority Data

May 31, 1983 [JP] Japan .............................. 58-83456[U]

[51] Int. Cl.$^4$ ............................................. F16D 11/04
[52] U.S. Cl. .................................. 192/51; 192/87.16; 192/109 A
[58] Field of Search ..................... 192/51, 87.14, 87.15, 192/87.16, 87.17, 109 R, 109 A, 109 B, 48.91, 53 F, 4 C

[56] References Cited

U.S. PATENT DOCUMENTS

Re. 29,601 4/1978 Richards ......................... 192/48.91
3,585,873 6/1971 Austen .................................. 192/51

FOREIGN PATENT DOCUMENTS 5234516 3/1982 Japan .
951038 3/1964 United Kingdom ............... 192/51

Primary Examiner—Larry I. Schwartz
Attorney, Agent, or Firm—Burns, Doane, Swecker and Mathis

[57] ABSTRACT

The disclosure describes a cone clutch comprising an axially unslidable rotation shaft; a cone body connected to the rotation shaft through a helical spline, adapted to be axially shifted by a shifter or the like, and provided at the outer periphery with a pair of conical faces for frictional engagement; a pair of cone cups disposed at both sides of the cone body, carried rotatably and axially slidably on the rotation shaft, and provided with a pair of conical faces operable to frictionally engage with the faces of the cone body respectively; rotation force transmitting mechanism for transmitting rotation forces in respectively opposite directions to the cone cups; and spring mechanism disposed between the rear sides of the cone cups for forcing the rear faces of the cone cups toward the cone body, respectively.

6 Claims, 5 Drawing Figures

CONE CLUTCH

BACKGROUND AND SUMMARY OF THE INVENTION

The present invention relates to a cone clutch especially suitable for a transmission selectively shiftable to a forward position and reverse position of a small boat.

A conventional mechanism is detailed below with reference to FIG. 1. In FIG. 1, an input shaft 2 and an output shaft 3 are carried parallel to each other in a case 1. The output shaft 3 rotatably supports a pair of cone cups 5 respectively having inner peripheral faces 4 of conical shape. The cone cups 5 are respectively provided at the outer peripheries with teeth 6 meshing with teeth 7 provided at the outer peripheries of the input shaft 2. The teeth 6 of the one cup 5 directly mesh with the teeth 7, and the teeth 6 of the other cup 5 mesh with the teeth 7 through an idle gear (not shown). A cone body 9 is supported on the output shaft 3 slidably through a helical spline 10. The cone body 9 is located between the cone cups 5 and is provided with conical outer peripheral faces 8 which face and are engageable to the conical inner periphral faces 4. The cone body 9 is provided at the outer peripheral surface with an annular groove into which a shift fork (not shown) engages. The shift fork is operable to axially shift the cone body 9 to press and frictionally engage the face 8 to the face 4 selectively.

The inclination of the spline 10 is so determined that the cone body 9 may be forced toward the corresponding cone cup 5 when the body 9 is pressed to the cup 5 to receive a rotational force. Namely, the helical spline 10 functions to press the cone body 9 against the cone cup 5 by the force corresponding to the transmitted torque.

However, according to the above conventional structure, the fluctuation of the transmitted torque causes a fluctuation of the above pressing force for the engagement. Especially, in a low speed area of a Diesel engine, the torque largely fluctuates, so that the the cone body 9 sometimes slips on or disengage from the cup 5. This promotes the wear of the faces 4 and 8 for the frictional engagement and may interrupt the engagement.

A structure overcoming the above problem is disclosed in the Japanese patent application No. 57-34516 corresponding to the Swedish patent application No. 8101424-3. According to the first embodiment of the above Japanese application, an intermediate shaft carrying a cone body is slidable with respect to input cone cups and is forced by springs, so that the axial movement of the intermediate shaft may absorb the fluctuation of the pressing force for the engagement.

However, in this structure, the intermediate shaft should be constructed slidable, which causes a problem that the construction is complicated.

In other embodiments of the above application, a cone body is divided into two portions, one of which is connected to a shaft, and the others are designed to be pressed to cone cups. Springs are disposed between both portions of the cone body. This structure also has complicated constructions. Further, since the cone body is generally made of soft material such as brass or bronze, these divided portions spline together may not have a sufficient strength.

Further, in both of the above embodiments, since it is necessary to use the slidable shaft or the divided cone body, they have another problem that the conventional shaft 3 and the cone body 9 in FIG. 1 can not be used in the structures of those embodiments.

Accordingly, it is an object of the invention to provide a cone clutch having simple constructions and operable to absorb a fluctuation of a pressing force for an engagement caused by a fluctuation of a toque.

According to the invention, a cone clutch comprises a rotation shaft which is axially unslidable; a cone body which is connected to the rotation shaft through a spline, is operable to be axially shifted by a shift means, and is provided at the outer periphery with a pair of conical friction faces; a pair of cone cups which is carried on the rotation shaft rotatably and slidably in the direction opposite to the cone body, and has conical friction faces operable to be pressed to above conical friction faces, respectively; a force transmission means for trnsmitting a rotation force to both cone cups respectively in directions opposite to each other; and force means for forcing the near faces of the respective cone cups toward the cone body.

Other and further objects, features and advantages of the invention will appear more fully from the following description of the preferred embodiments of the invention.

DETAILED DESCRIPTION OF THE PREFERRED EMBODIMENTS

Figure 1:
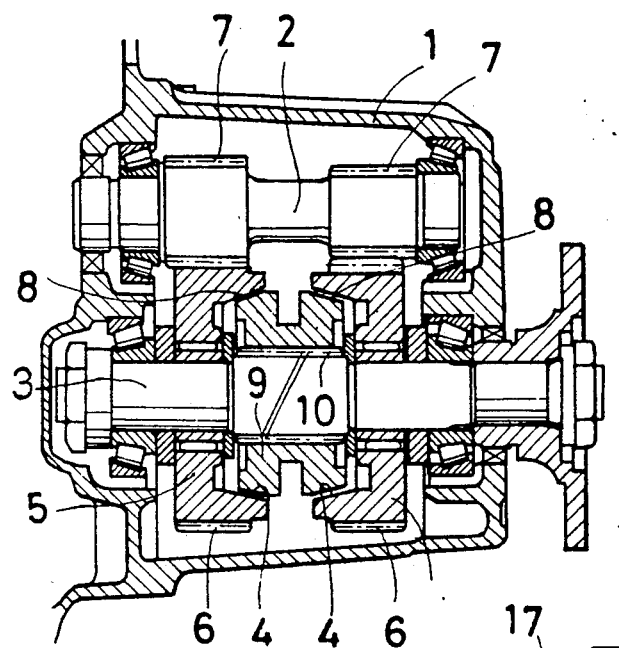
FIG. 1 is a sectional view of a conventional cone clutch.
Figure 2:
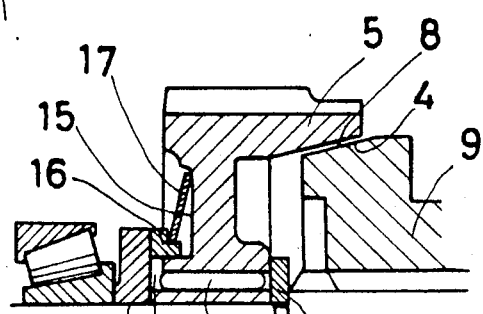
FIG. 2 is an enlarged sectional partial view of a cone clutch in an engaged condition of an embodiment of the invention.

Referring to FIG. 2, the structures shown are similar in some mechanisms to those in FIG. 1, and thus, the same members bear the same reference numbers. In the following description, different members and parts are mainly detailed.

Referring to FIG. 2, a cone cup 5 is disposed between thrust collars 11 and 12, and is carried on an output shaft 3 through a bearings 13. An axial space 14 is formed between the rear thrust collar 11 and the rear surface of the cup 5, so that the cup 5 may be able to slide through the space 14. The cone cup 5 is provided at the rear surface with an annular hollow 15. A support 16 is disposed in the radially inner portion of the hollow 15 and is supported by the thrust collar 11. A Belleville spring 17 is disposed between the support 16 and the rear surface of the hollow 15, so that the spring 17 may force the cone cup 5 toward a cone body 9 when the cup 5 slides toward the collar 11.

Figure 3:
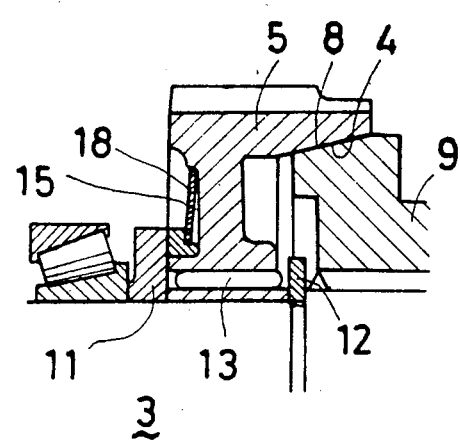
FIG. 3 is an enlarged sectional partial view of a cone clutch in a released condition of FIG. 2.

According to the above structures, when the cone body 9 is operated to slide and engage into the cone cup 5, as shown in FIG. 3, the cone cup 9 is forced and slides toward the collar 11, and thus, the spring 17 is compressed. The compressed spring 17 elastically forces the cone cup 5 toward the cone body 9. Therefore, even in such a case that the pressing force of the body 9 against the cup 5 changes in accordance with the change of the transmitted torque, the cone cup 5 is stably pressed against the body 9 by the elastic force of the spring 17, which prevents a slip and a disengagement between the cup 5 and the body 9.

Figure 4:
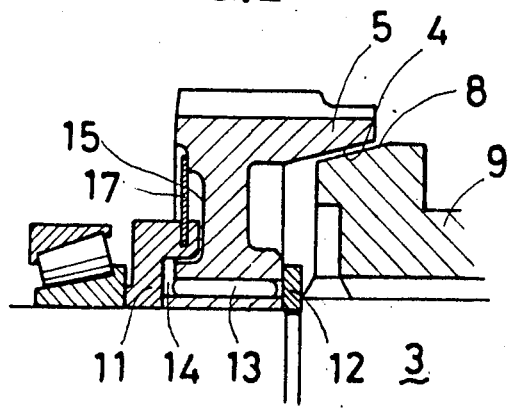
FIG. 4 is an enlarged sectional partial view of a cone clutch of another embodiment of the invention.

Another embodiment is disclosed in FIG. 4. In this embodiment, a thrust collar 11 at a rear side of a cone cup 5 is integrally provided with a support which supports plate springs 18. The springs 18 function similarly as the spring 17 in FIG. 2.

Figure 5:
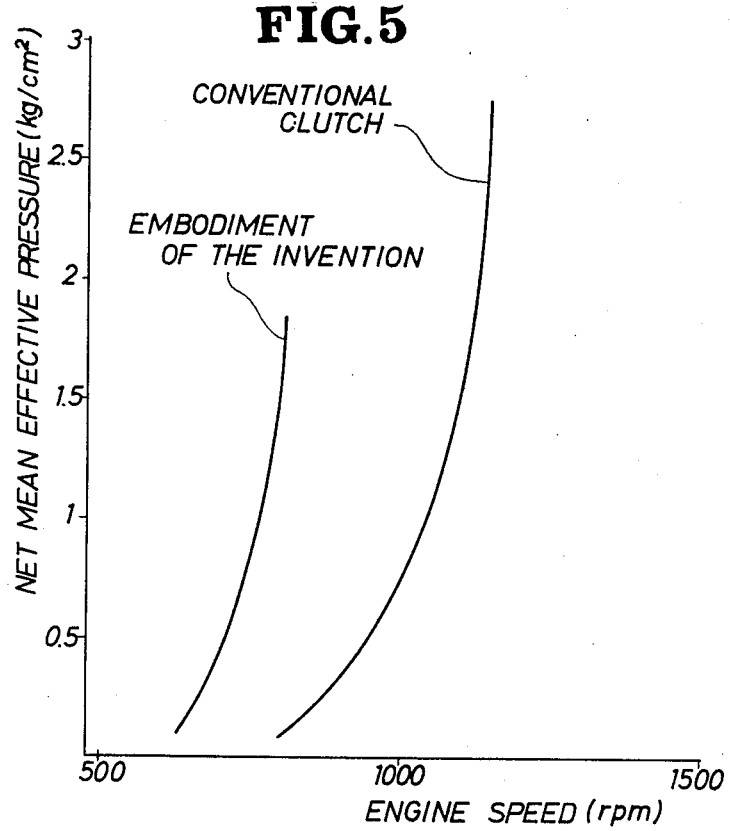
FIG. 5 is a graph showing a relation between an engine speed and a net mean effective pressure.

FIG. 5 shows characteristics of the embodiment and the conventional structures in which a spring means is not employed. In FIG. 5, left sides to the curve lines (characteristic lines) are areas in which the slips are caused by the fluctuation of the torque. As apparent from FIG. 5, the engine speed in which the slip occurs is lower in the embodiment of the invention than that in the conventional clutch.

Springs other than the springs 17 and 18 may be employed for forcing the cup 5. Combination of the springs 17, 18 and/or the others may be employed, so that a spring constant may changes dependently on a compression stroke. According to the use of this combination of the springs, a rapid shock at the engaging operation can softly and effectively be absorbed, and after the engagement, the cup 5 can be strongly supported by the springs, so that such an ideal clutch can be obtained that may not generates a shock at the engaging operation and a slip even in an engaged condition of a low load and a high torque.

Although, in the above descriptions, the mechanism relating to only one of the cone cup pairs are detailed, other cone cup mechanism also has similar structures and is provided with a spring means.

In the invention, as stated hereinbefore, even in such a case that the pressing force of the cone body 9 changes in accordance with the change of the engine torque, the spring 17 forces the cone cup 5 toward the body 9. Therefore, the slip causing a wear can be prevented. Further, such a disadvantage that the clutch can not engage is prevented.

It is necessary neither to construct the output shaft axially slidable nor to employ a cone body of divided structures. Therefore, the structure can be simple and the cost can be reduced. The parts in the conventional clutch of FIG. 1, such as the shaft 3, the cone cups 9 and others can be used in the clutch of the invention. This also reduces the cost. The invention has also such an advantage that the output shaft 3 can be connected directly to a propeller shaft.

Although the invention has been described in its preferred form with a certain degree of particularity, it is undestood that the present disclosure of the preferred form may be changed in the details of construction and arrangement of parts may be resorted to without departing from the spirit and scope of the invention as hereinafter claimed.

What is claimed is:

1. A cone clutch comprising an axially fixed rotatable shaft; a cone body connected to the rotation shaft through a helical spline and provided at an outer peripheral section with a pair of conical faces providing a frictional engagement surface; operating means for axially shifting said cone body; a pair of cone cups disposed on both sides of the cone body and being rotatable and axially slidable on the rotatable shaft; a pair of conical friction facings provided on said cone cups and being operable to frictionally engage with the conical facings of said cone body; rotational force transmitting means for transmitting rotational force in opposite directions of the cone cups; spring means disposed on a side of the cone cups opposite said conical face for forcing the cone cups toward the cone body.

2. A cone clutch as defined in claim 1, wherein an annular hollow is provided on said opposite side adjacent a thrust collar provided with a projection extending into said hollow; said spring means defining a plate-like spring disposed in said hollow with one end of the spring seated on the cone cup and an opposite end of the spring seated on the projection.

3. The cone clutch of claim 1 wherein said spring means includes spring seat members disposed axially fixed on the rotatable shaft and springs of which inner and outer peripheries are supported respectively by the spring seat members and the opposite side of the cone cup, respectively.

4. A cone clutch of claim 1 wherein said rotatable shaft is carried at rear sides of the cone cups by a case through bearings, a thrust collar is disposed between the rear face of each cone cup and each bearing, and each of said spring means comprises a Belleville spring of which inner and outer peripheries are supported by the thrust collar and the rear face of the cone cup, respectively.

5. The cone clutch of claim 1 wherein said rotatable shaft is carried at rear sides of the cone cups by a case through bearings, a thrust collar is disposed between the rear face of each cone cup and each bearing, and each of said spring means comprises plate springs of which radially inner and outer portions are supported by the thrust collar and the rear face of the cone cups, respectively.

6. The cone clutch of claim 1 wherein said rotatable shaft is connected axially unmovably and coaxially to a driven shaft.

* * * * *